United States Patent
Byron et al.

(10) Patent No.: US 11,907,990 B2
(45) Date of Patent: Feb. 20, 2024

(54) DESIRABILITY OF PRODUCT ATTRIBUTES

(71) Applicant: INTERNATIONAL BUSINESS MACHINES CORPORATION, Armonk, NY (US)

(72) Inventors: Donna K. Byron, Petersham, MA (US); Carmine DiMascio, West Roxbury, MA (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 15/718,410

(22) Filed: Sep. 28, 2017

(65) Prior Publication Data

US 2019/0095973 A1 Mar. 28, 2019

(51) Int. Cl.
*G06Q 30/0601* (2023.01)
*G06Q 30/0282* (2023.01)
*G06F 40/35* (2020.01)
*G06F 40/47* (2020.01)

(52) U.S. Cl.
CPC ......... *G06Q 30/0627* (2013.01); *G06F 40/35* (2020.01); *G06F 40/47* (2020.01); *G06Q 30/0282* (2013.01); *G06Q 30/0641* (2013.01)

(58) Field of Classification Search
CPC ...... G06Q 30/0601–0645; G06F 40/35; G06F 40/47
See application file for complete search history.

(56) References Cited

U.S. PATENT DOCUMENTS

| | | | |
|---|---|---|---|
| 7,409,335 B1 | 8/2008 | Horvitz et al. | |
| 7,430,505 B1 | 9/2008 | Horvitz et al. | |
| 7,519,529 B1 | 4/2009 | Horvitz | |
| 7,778,820 B2 | 8/2010 | Horvitz et al. | |
| 10,346,900 B1* | 7/2019 | Wilson | G06F 8/38 |
| 2002/0087388 A1 | 7/2002 | Keil et al. | |
| 2004/0059626 A1 | 3/2004 | Smallwood | |
| 2005/0004880 A1 | 1/2005 | Musgrove et al. | |
| 2007/0233730 A1* | 10/2007 | Johnston | G06Q 30/02 |
| 2008/0249764 A1 | 10/2008 | Huang et al. | |

(Continued)

OTHER PUBLICATIONS

Yasser Salem; "An Experience-Based Critiquing Approach to Conversational Recommendation"; Jul. 2016; Queen's University Belfast (Year: 2016).*

(Continued)

*Primary Examiner* — Michelle T Kringen
(74) *Attorney, Agent, or Firm* — Michael O'Keefe (57) ABSTRACT

A method, computer system, and computer program product for determining a desirability of a product attribute are provided. The embodiment may include extracting a plurality of product features corresponding to one or more products. The embodiment may also include analyzing a plurality of product reviews to determine a sentiment toward the extracted product features. The embodiment may further include calculating a desirability score for each product feature. The embodiment may also include, in response to receiving a user query associated with a product, identifying a product feature to which the received user query relates. The embodiment may further include generating a response to the received user query based on the calculated desirability score.

9 Claims, 7 Drawing Sheets

(56) References Cited

U.S. PATENT DOCUMENTS

| | | | | |
|---|---|---|---|---|
| 2009/0282019 | A1* | 11/2009 | Galitsky | G06F 17/2765 |
| 2012/0197816 | A1* | 8/2012 | Short | G06Q 30/0282 |
| | | | | 705/347 |
| 2014/0188665 | A1* | 7/2014 | Baker | G06Q 30/0625 |
| | | | | 705/26.62 |
| 2014/0207776 | A1* | 7/2014 | Harris | G06Q 10/10 |
| | | | | 707/737 |
| 2014/0297479 | A1* | 10/2014 | McCloskey | G06Q 30/0627 |
| | | | | 705/26.63 |
| 2014/0379516 | A1* | 12/2014 | Levi | G06Q 30/0631 |
| | | | | 705/26.7 |
| 2016/0012135 | A1* | 1/2016 | Wang | G11C 5/06 |
| | | | | 707/731 |
| 2016/0170997 | A1 | 6/2016 | Chandrasekaran et al. | |
| 2016/0180244 | A1 | 6/2016 | Britt et al. | |
| 2016/0342288 | A1* | 11/2016 | Konik | G06F 16/24578 |
| 2016/0364391 | A1 | 12/2016 | Eichenlaub et al. | |
| 2017/0068965 | A1* | 3/2017 | Parveen | G06Q 30/0201 |
| 2017/0124575 | A1 | 5/2017 | Clark et al. | |
| 2018/0052885 | A1* | 2/2018 | Gaskill | G06N 5/04 |

OTHER PUBLICATIONS

N. M. Rizk, A. Ebada and E. S. Nasr, "Investigating mobile applications' requirements evolution through sentiment analysis of users' reviews, " 2015 11th International Computer Engineering Conference (ICENCO), Cairo, Egypt, 2015, pp. 123-130, doi: 10.1109/ICENCO.2015.7416336. (Year: 2015).*

Mell et al., "The NIST Definition of Cloud Computing," National Institute of Standards and Technology, Sep. 2011, pp. 1-3, Special Publication 800-145.

Wikipedia, "Conjoint analysis", https://en.wikipedia.org/wiki/Conjoint_analysis, printed on Sep. 27, 2017, pp. 1-6.

Adomavicius et al., "Context-Aware Recommender Systems", Recommender Systems Handbook, Chapter 6, pp. 191-226, copyright Springer Science+Business Media, New York, 2015 (best date available).

Bolter, "Predicting Product Review Helpfulness Using Machine Learning and Specialized Classification Models", Master's Projects, Master's Theses and Graduate Research, San Jose State University, SJSU ScholarWorks, May 2013, http://scholarworks.sjsu.edu/etd_projects/348, pp. 1-54.

* cited by examiner

DESIRABILITY OF PRODUCT ATTRIBUTES

BACKGROUND

The present invention relates, generally, to the field of computing, and more particularly to conversational systems.

Conversational systems relate to software programs capable of receiving and analyzing human speech to perform an action and returning a response in a coherent structure. Some conversational systems integrate various speech recognition, natural language processing, and dialog understanding technologies to perform necessary tasks. Some typical uses of conversational systems include virtual assistants, customer care systems, and the Internet of Things.

SUMMARY

According to one embodiment, a method, computer system, and computer program product for determining desirability of a product attribute are provided. The embodiment may include extracting a plurality of product features corresponding to one or more products. The embodiment may also include analyzing a plurality of product reviews to determine a sentiment toward the extracted product features. The embodiment may further include calculating a desirability score for each product feature. The embodiment may also include, in response to receiving a user query associated with a product, identifying a product feature to which the received user query relates. The embodiment may further include generating a response to the received user query based on the calculated desirability score.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to conversational systems. The following described exemplary embodiments provide a system, method, and program product to, among other things, construct a unique user navigation response for situations where a conversational system may infer whether a product attribute is desirable or undesirable in order to traverse the appropriate conversational branch with a user. Therefore, the present embodiment has the capacity to improve the technical field of conversational systems by minimizing the number of dialog turns needed to return the needed information to the user thereby reducing the burden on resources and increasing system efficiency.

As previously described, conversational systems relate to software programs capable of receiving and analyzing human speech to perform an action and returning a response in a coherent structure. Some conversational system integrate various speech recognition, natural language processing, and dialog understanding technologies to perform necessary tasks. Some typical uses of conversational systems include virtual assistants, customer care systems, and the Internet of Things.

A conversational system may utilize conjoint analysis while analyzing a user query and determine a proper response. Conjoint analysis relates to a statistical technique that determines how individuals value various attributes. By leveraging conjoint analysis, more relevant results may be returned during an information/product exploration dialog between the user and conversation system since the desired answer to a conversational query about a specific product may be predicted.

In consumer services, conversational systems have become a popular technology to utilize when interacting with online information, such as product catalogs or customer support. Similarly, many consumer-facing devices, such as Amazon Alexa® (Amazon Alexa and all Amazon Alexa-based trademarks and logos are trademarks or registered trademarks of Amazon.com, Inc. and/or its affiliates), assist users in traversing information offered in online databases without requiring the user to manually locate the information through more traditional means, such as an internet search engine. Unlike in a graphical user interface where the user can enter complex search terms and apply filters in a single instance, a conversational system provides a user the capability to deliver information incrementally, such as by asking a pointed question about a specific product or applying a high level filter after a search has been returned (e.g., Does this camera have a zoom function?"). When receiving and processing incremental questions, it is important for the backend system to be proactive and offer helpful information that continually makes progress towards the user's task and to minimize the number of dialog turns needed to reach the desired information rather than simply answering the immediate user query. As such, it may be advantageous to, among other things, determine and incorporate the desirability of product attributes when providing a response to a user query in a conversational system.

According to one embodiment, any attribute that is mentioned in a query tends to be assumed as an important or necessary attribute by the user. However, in some situations, an attribute mentioned in a user query may be an undesirable attribute the user wishes to be excluded. Therefore, conjoint analysis of product attributes may assist in determining the sentiment towards a specific product attribute so that a proper response to a user query may be provided thereby allowing the dialog between the user and the conversational system to proceed appropriately. For example, if the user queries the conversational system about a specific product attribute that receives complaints from previous purchasers of the product, the conversational system may generate a response that suggests the user consider a different product with more favorable reviews of the specific attribute rather than simply returning a response that plainly answer's the query without any guidance to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to consider the sentiment toward a specific product attribute when queried during a dialog between a user and a conversational system in order to generate an appropriate response that advances the dialog towards a predicted destination.

Figure 1:
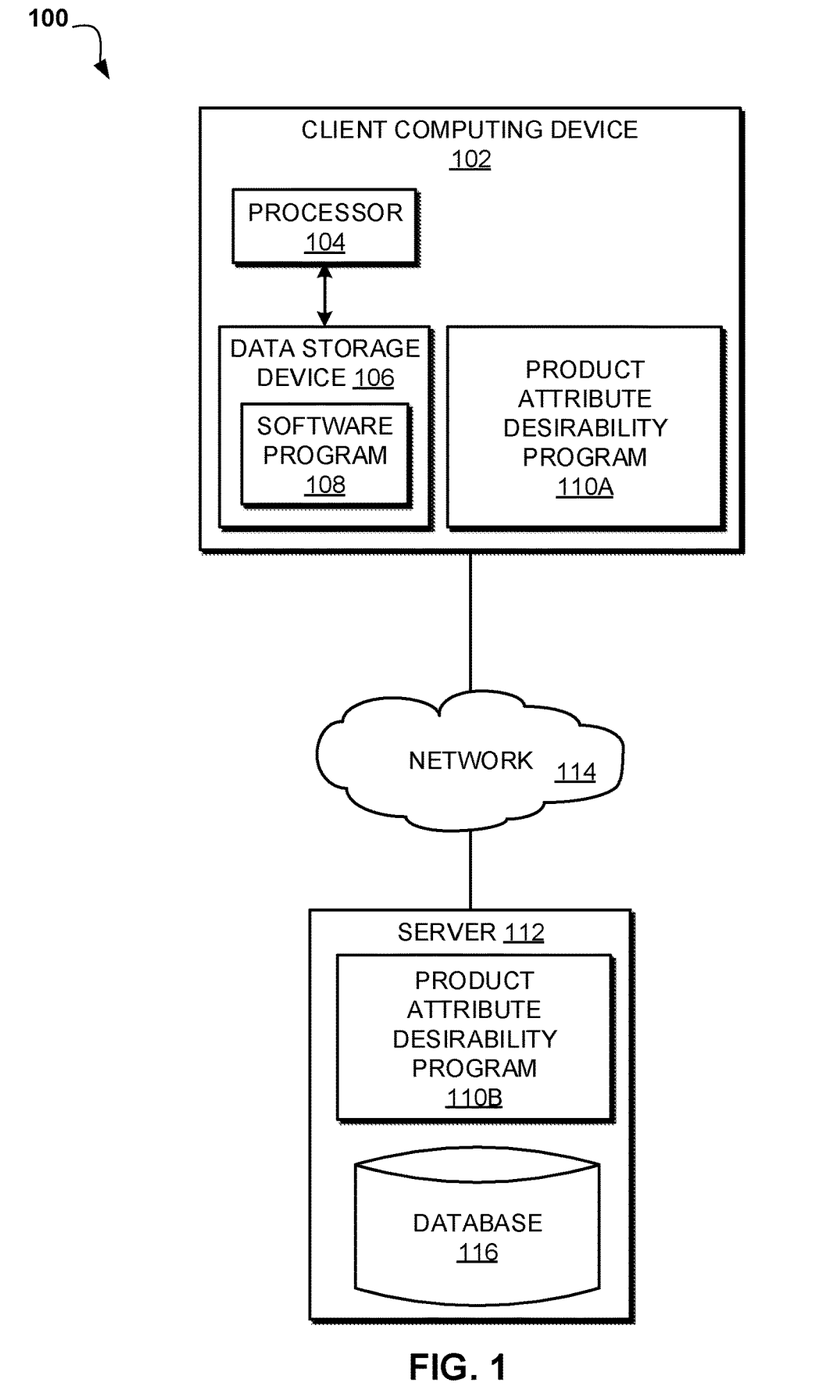
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a product attribute desirability program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a product attribute desirability program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the product attribute desirability program 110A, 110B may be a program capable of generating a list of product features, parsing product reviews to determine sentiment towards each attribute on the generated list, and calculating a desirability score for each attribute. Once a user query is received by a conversational system, the product attribute desirability program 110A, 110B may be capable of determining the product features and associated desirability score for the applicable product within the user query and generate a response to be presented to the user that appropriately integrates the desirability of the product attribute. The product attribute desirability method is explained in further detail below with respect to FIG. 2.

Figure 2:
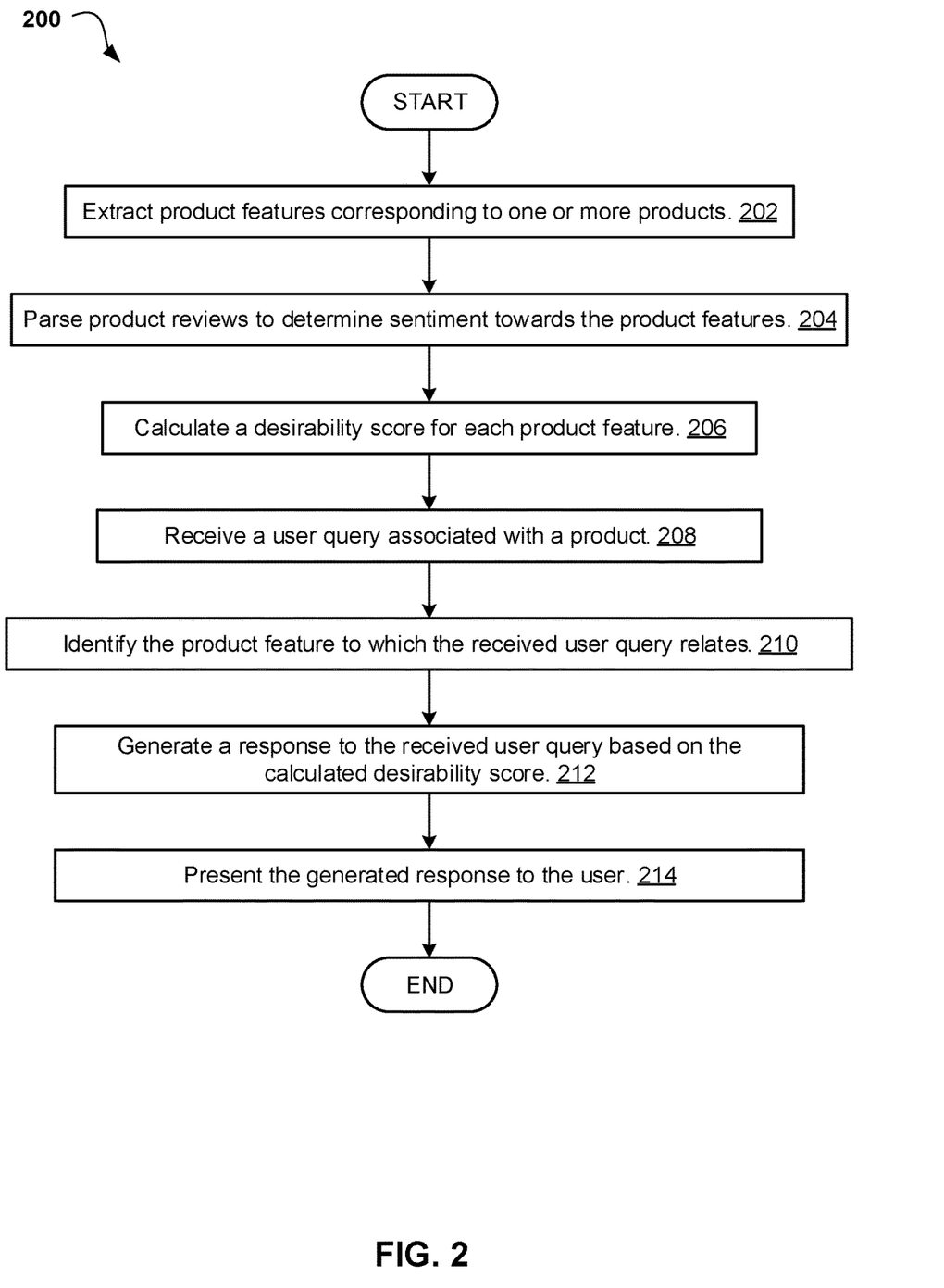
FIG. 2 is an operational flowchart illustrating a product attribute desirability process according to at least one embodiment.

FIG. 2 is an operational flowchart illustrating a product attribute desirability process 200 according to at least one embodiment. At 202, the product attribute desirability program 110A, 110B extracts product features corresponding to one or more products. During initialization, the product attribute desirability program 110A, 110B may parse through repositories, such as database 116, to extract a list of attributes and features of products and the possible values of each entry in the list, both numerical and categorical. The list of attributes and features may contain product attribute information, such as model number, product number, size information, performance specifications, color, available features, quantity per package, and amount per package. For example, a repository containing product information related to cameras may include the camera model, embedded sensors, focal length, zoom, and display screen parameters. In at least one embodiment, properties stored in the product attribute information may not be features per se. For example, if a repository contains information about cameras sold by a retailer, the product attribute information may include the image quality of a camera.

Then, at 204, the product attribute desirability program 110A, 110B parses product review to determine sentiment towards the product features. The product attribute desirability program 110A, 110B may analyze one or more repositories, such as database 116, that store information related to product reviews in order to determine general user sentiment toward specific product attributes For each product review in a given category, the product attribute desirability program 110A, 110B may identify and record the product features or attributes that are mentioned by the reviewer, the actual feature values according to the product specifications, and the reviewer's sentiment toward the specific feature. For example, a product review of a 83× point-and-shoot camera may include the language, "This thing is a lot of fun. The image quality is so-so but the zoom is fun. You can get pictures of things you never dreamed of before!" Based on this product review, the product attribute desirability program 110A, 110B may identify the zoom feature received a positive statement and the specifications of the zoom feature should be recorded. For example, the product attribute desirability program 110A, 110B may record the metadata as "(zoom, 83×, positive sentiment)". Similarly, the product attribute desirability program 110A, 110B may record the metadata for the image quality as "(image quality, bad, negative sentiment)" since the review did not provide positive feedback for the image quality of the reviewed camera.

Next, at 206, the product attribute desirability program 110A, 110B calculates a desirability score for each product feature. The desirability score may be a numerical value measuring the importance of a feature based on the parsed product reviews that may be calculated as a comparison of the positive review and the negative reviews of each feature. For example, if a specific feature received 20 positive reviews and 10 negative reviews, the product attribute desirability program 110A, 110B may calculate the desirability score as +10 since more positive reviews were received than negative reviews. The desirability score may be measure of the tradeoff between the positive reviews and negative reviews where a tradeoff value (i.e., a zero value desirability score) is the point where the total number of negative reviews equal the total number of positive reviews in a cohort. In at least one embodiment, the product attribute desirability program 110A, 110B may sort each product feature or attribute by the desirability score thereby placing the features or attributes with the highest desirability score, or more important features and attributes according to product reviews, above features or attributes with lower desirability scores. In at least one other embodiment, the product attribute desirability program 110A, 110B may categorize each feature or attribute based on the desirability score satisfying a threshold value, or a preferred desirability score. For example, features or attributes with a desirability score that satisfies a threshold may be assigned a "necessary" tag to indicate that the specific feature or attribute is highly desirable based on the parsed product reviews.

Then, at 208, the product attribute desirability program 110A, 110B receives a user query associated with a product. When interacting with a conversational system, the user may present a question about a specific product to which the conversational system may be required to provide a response. For example, in a dialog about a specific camera, a user may ask a conversational system, "What is the resolution of the sensor?".

Next, at 210, the product attribute desirability program 110A, 110B identifies the product feature to which the receive user query relates. Using known natural language processing techniques, the product attribute desirability program 110A, 110B may identify the feature or attribute mentioned within the received user query. In the previous example where the user query is "What is the resolution of the sensor?", the product attribute desirability program 110A, 110B may identify the feature or attribute as "camera resolution".

Then, at 212, the product attribute desirability program 110A, 110B generates a response to the received user query based on the calculated desirability score. Once the product attribute desirability program 110A, 110B identifies the product feature or attribute to which the received user query is focused, the product attribute desirability program 110A, 110B may determine if that specific feature or attribute is present on the instant product and, if present, the desirability of the specific feature or attribute. The product attribute desirability program 110A, 110B may then generate an appropriate response that incorporates the availability of the feature or attribute in the product and the desirability of the feature or attribute. For example, for the previous user query of "What's the resolution of the sensor?", the product attribute desirability program 110A, 110B may determine that a camera is present on the product being discussed in the dialog between the user and the conversational system and, based on the parsed product features, the camera resolution is 24 megapixels. The product attribute desirability program 110A, 110B may then generate a response that includes the information that the camera resolution is 24 megapixels that is appended with a prediction as to the desirability of the feature or attribute and the corresponding desirability value. For example, if the desirability of the feature or attribute is favorable based on the desirability score, the product attribute desirability program 110A, 110B may generate the response of "24 megapixels, which many people who purchased this product liked."

In at least one embodiment, the product attribute desirability program 110A, 110B may utilize machine learning of previous user queries to determine whether a user would be dissatisfied with a particular feature or attribute's omission from or unfavorable reviews in a product. For example, if the user submits the query "Does this camera have a touchscreen?", the product attribute desirability program 110A, 110B may determine from the list of product attributes and features that the subject camera of a dialog between the user and the conversational system does not have a touchscreen. However, using machine learning, the product attribute desirability program 110A, 110B may be capable of determining that the user does not have a preference as to the inclusion of a touchscreen on the camera and may record that prediction and subsequent user actions with respect to the subject product to further improve future predictions. For example, upon learning the subject camera does not have a touchscreen, the product attribute desirability program 110A, 110B may record whether or not the user searches for a different camera as validation or disproval of the prediction.

In another embodiment, if the product attribute desirability program 110A, 110B determines a particular feature or attribute is not present in a product, the product attribute desirability program 110A, 110B may suggest another product to the user. For example, for the user query "Does this camera have a touchscreen?", if the product attribute desirability program 110A, 110B determines the subject camera in the dialog does not have a touchscreen, the product attribute desirability program 110A, 110B may analyze the desirability scores for similar cameras and generate the query response "Unfortunately, this model does not have a touchscreen. However, I can recommend other models that have a touchscreen".

In yet another embodiment, the product attribute desirability program 110A, 110B may emphasize an important attribute or feature of a product in a query response that may not have been the subject of the query so that the user is made aware of the favorable product feature. For example, if the user query is "Does this camera have a touchscreen?", the product attribute desirability program 110A, 110B may generate the query response of "No. This model doesn't have a touchscreen. It prioritizes a shock-resistant body with easy to find manual controls for your outdoor action shots."

Next, at 214, the product attribute desirability program 110A, 110B presents the generated response to the user. Upon generating the query response, the product attribute desirability program 110A, 110B may present the generated response to the user on a graphical user interface of the client computing device 102. In at least one embodiment, the product attribute desirability program 110A, 110B may present the generated response to the user through other interfaces, such as a voice interface. For example, if the user is interacting with a conversational system, the conversational system may utilize text-to-speech technology to present the generated response to the user in human speech. Furthermore, the product attribute desirability program 110A, 110B may allow the user to submit a follow up question that builds on the presented response or clarifies information about the same or a different product feature or attribute.

Figure 3:
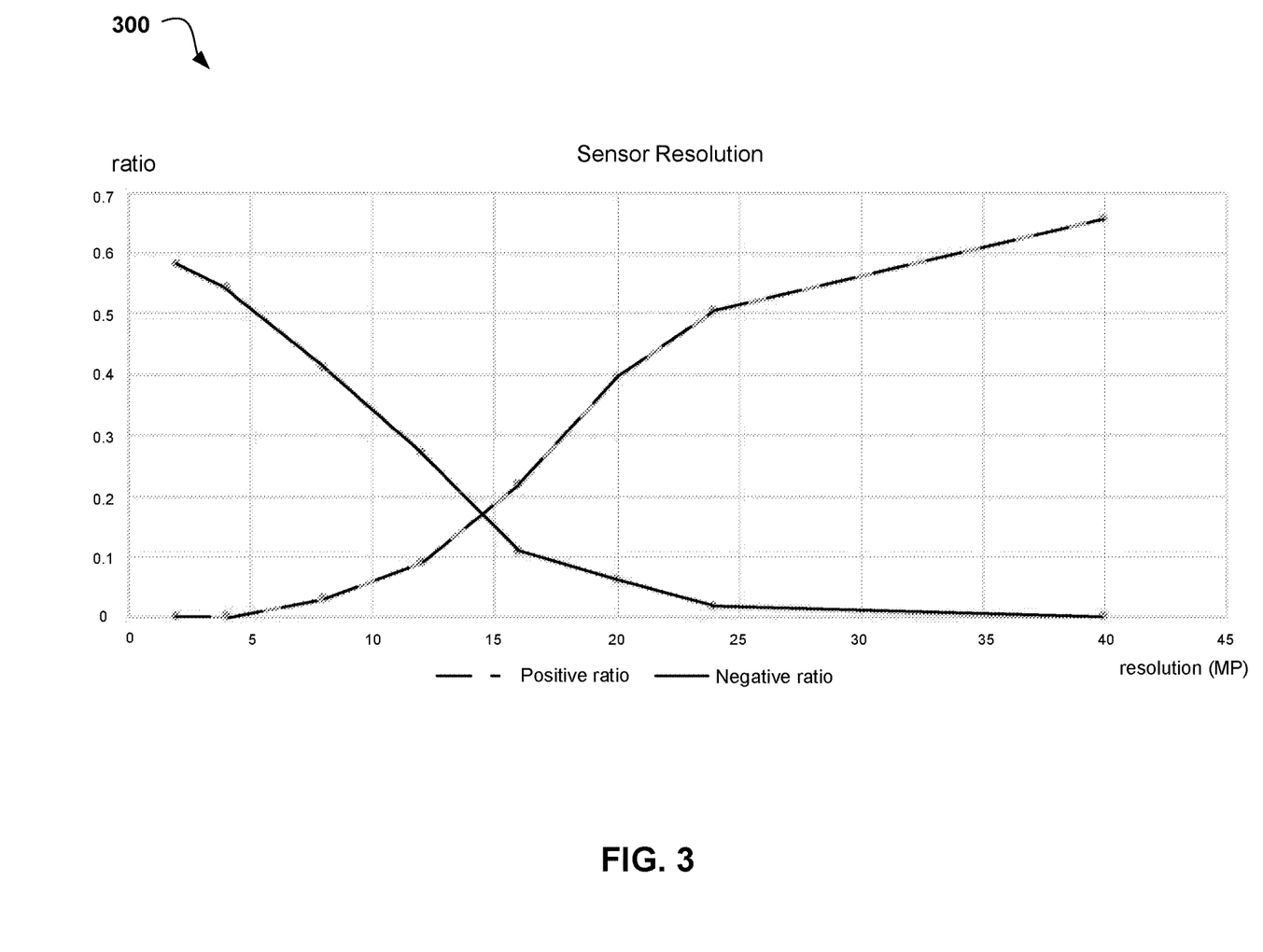
FIG. 3 is an attribute tradeoff graph according to at least one embodiment.

Referring now to FIG. 3, an attribute tradeoff graph 300 is depicted according to at least one embodiment. When the product attribute desirability program 110A, 110B calculates the desirability score for a product feature, the product attribute desirability program 110A, 110B may calculate the desirability score for different variations (e.g., numerical values) of that feature. For example, in a camera, the product attribute desirability program 110A, 110B may calculate the desirability for different sensor resolution values. The product attribute desirability program 110A, 110B may analyze product reviews for cameras with different sensor resolutions and generate a table, such as Table 1 below.

TABLE 1

| Sensor Resolution (MP) | Positive Sentiment | Negative Sentiment | Not Mentioned | Total Reviews | Positive Ratio | Negative Ratio |
| --- | --- | --- | --- | --- | --- | --- |
| 2 | 0 | 73 | 53 | 126 | 0 | 0.579 |
| 4 | 0 | 65 | 55 | 120 | 0 | 0.541 |
| 8 | 4 | 53 | 72 | 129 | 0.031 | 0.410 |
| 12 | 10 | 30 | 71 | 111 | 0.090 | 0.270 |
| 16 | 24 | 12 | 74 | 110 | 0.218 | 0.109 |
| 20 | 45 | 7 | 62 | 114 | 0.394 | 0.061 |
| 24 | 56 | 2 | 53 | 111 | 0.504 | 0.018 |
| 40 | 97 | 0 | 51 | 148 | 0.655 | 0 |

The product attribute desirability program 110A, 110B may plot the data within Table 1 to generate the attribute tradeoff graph 300 so the user may visually analyze at what screen resolution value the total number of positive reviews outweigh the total number of negative reviews. The positive and negative ratios may demonstrate the favorability or unfavorability of particular features. In the attribute tradeoff graph 300, the tradeoff value is approximately 14 megapixels. Therefore, high positive and negative ratios at both ends of the value range may show that the particular feature (e.g., sensor resolution in Table 1) may be a feature users care about in a camera, and that a high resolution camera is preferred. The attribute tradeoff graph 300 may be presented to the user through a graphical user interface of the client computing device 102.

Figure 4:
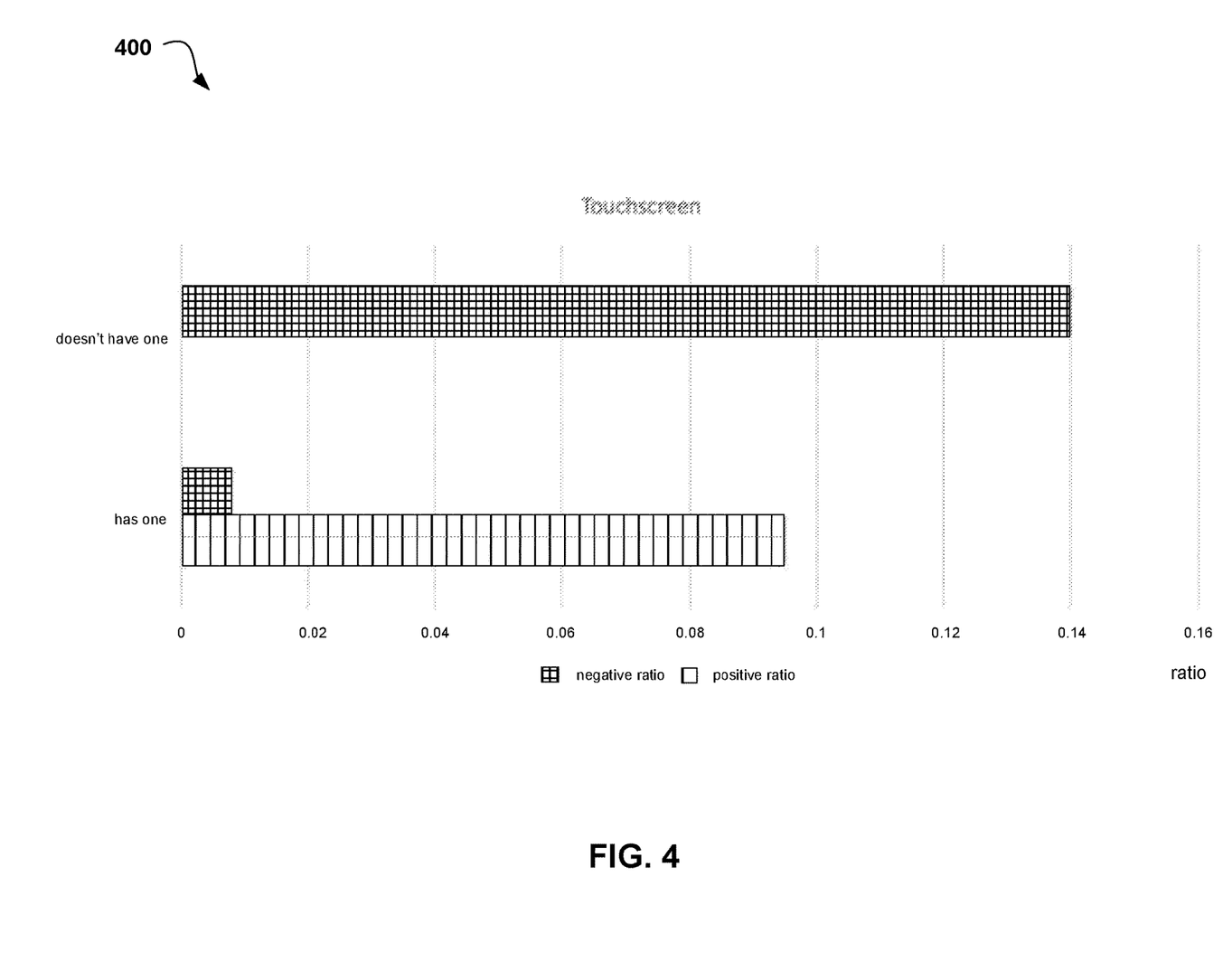
FIG. 4 is an attribute tradeoff bar graph according to at least one embodiment.

Referring now to FIG. 4, an attribute tradeoff bar graph 400 is depicted according to at least one embodiment. The product attribute desirability program 110A, 110B may also compare product reviews rating products with and without a specific feature or products with a feature that can take a number of categorical values. For example, the product attribute desirability program 110A, 110B may compare a camera with a touchscreen and without a touchscreen to determine overall sentiment to the presence of the feature or attribute. The product attribute desirability program 110A, 110B may generate a table, such as Table 2 below, that displays the relevant information.

TABLE 2

| Touchscreen | Positive Sentiment | Negative Sentiment | Not Mentioned | Total Reviews | Positive Ratio | Negative Ratio |
| --- | --- | --- | --- | --- | --- | --- |
| Has one | 12 | 1 | 113 | 126 | 0.095 | 0.007 |
| Doesn't have one | 0 | 22 | 135 | 157 | 0 | 0.140 |

The product attribute desirability program 110A, 110B may generate a graph, such as attribute tradeoff bar graph 400, that compares the overall sentiment towards the feature or attribute being present in a product versus the overall sentiment towards the feature or attribute not being present in the product. Given sufficient data, the product attribute desirability program 110A, 110B may analyze the feature or attribute presence by price point bands. For example, a digital zoom may be considered a positive feature on consumer-grade digital cameras but not on professional-grade cameras where optical zoom is expected.

It may be appreciated that FIGS. 2-4 provide only an illustration of one implementation and do not imply any limitations with regard to how different embodiments may be implemented. Many modifications to the depicted environments may be made based on design and implementation requirements. More specifically, in at least one embodiment, the cohort of product reviews may be extracted from a variety of sources, such as social media sites, online retailers, online review sites, or data analytics repositories. The product reviews may be categorized by the reviewer to create cohorts of users specific to a given product category. For example, since users who like photography and user to like outdoor activities may have varying expectations for a product, two separate cohorts may be created where one cohort has reviews for a product that are solely authored by users who like photography and another cohort has reviews for the same product that are solely authored by users who like outdoor activities. This cohort generation may allow a user with specific interests to receive information from a conversational system that more accurately predicts product attributes and features the user may deem favorable.

In another embodiment, the product attribute desirability program 110A, 110B may dynamically generate an advertisement for a product by selecting the product's most desirable attribute, fetching the value of that attribute, and composing a short message that is inserted into an image, such as a picture of a camera with the words "50 megapixels".

In yet another embodiment, the product attribute desirability program 110A, 110B may analyze the most desirable attribute and attribute values for an entire product category (e.g., all point-and-shoot cameras) and a given customer segment (e.g., amateur outdoor photographers), and displays each most desirable attribute to a user thereby allowing the user to create a new product that combines all of the most desirable attributes in a single product. For example, the product attribute desirability program 110A, 110B may determine that the most desirable features for sport enthusiasts are shock resistance, waterproofness, and long battery life. Therefore, the product attribute desirability program 110A, 110B may display these characteristics to a user thereby allowing the user to create and/or design a small factor, waterproof, shock-resistant camera with long battery life but only moderate image quality for sports enthusiasts. Similarly, the product attribute desirability program 110A, 110B may be capable of designing the product based on the most desirable features and attributes and presenting the generated design to the user for construction.

In at least one other embodiment, the product attribute desirability program 110A, 110B may not be limited to a conversational system but may operate on a variety of systems, such as data analytics, trend analysis, automated generation of new products, advertising, and web design.

Figure 5:
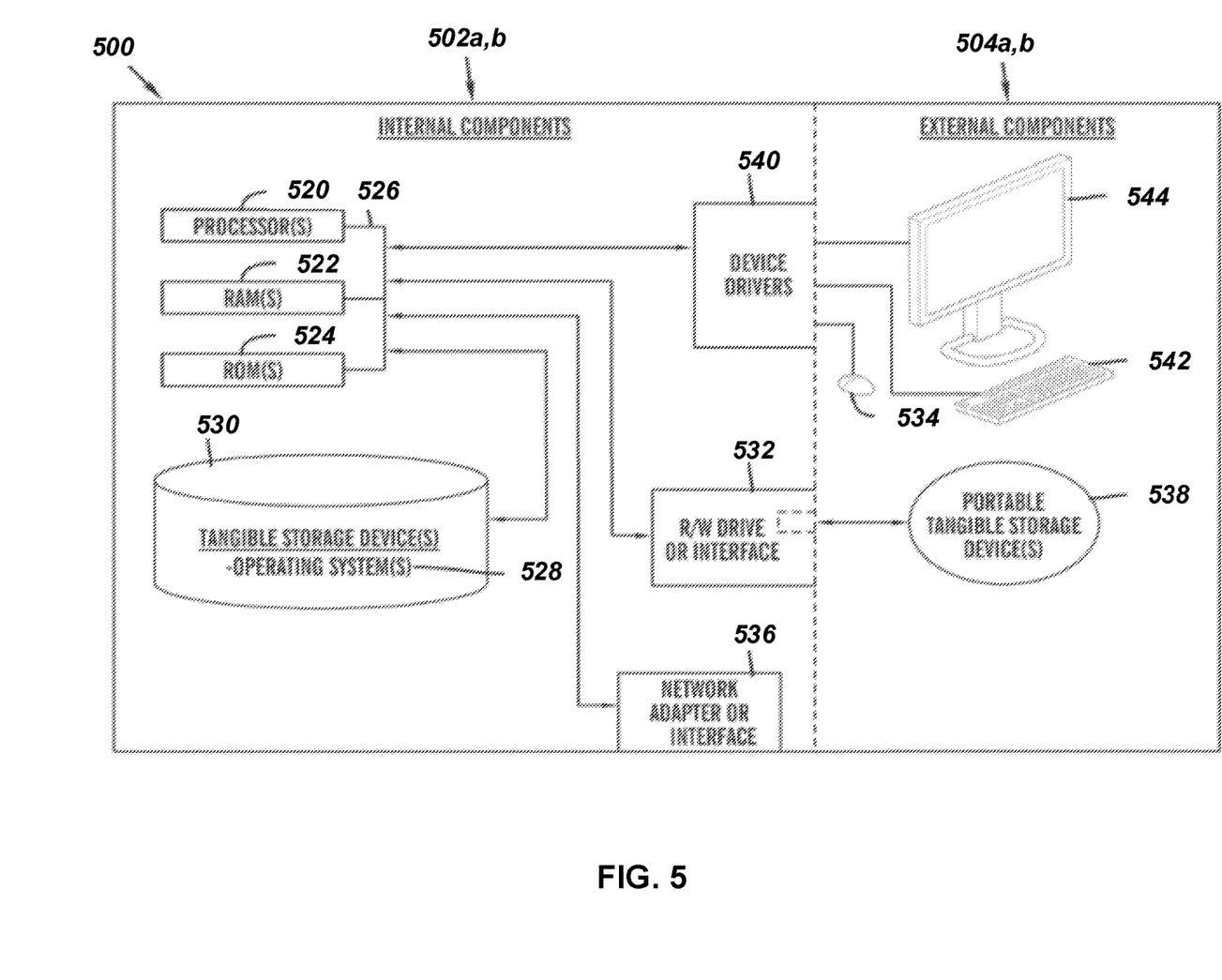
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may be represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502a,b and external components 504a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the product attribute desirability program 110A in the client computing device 102 and the product attribute desirability program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the product attribute desirability program 110A, 110B, can be stored on one or more of the respective portable computer-readable tangible storage devices 538, read via the respective R/W drive or interface 532, and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The software program 108 and the product attribute desirability program 110A in the client computing device 102 and the product attribute desirability program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the product attribute desirability program 110A in the client computing device 102 and the product attribute desirability program 110B in the server 112 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
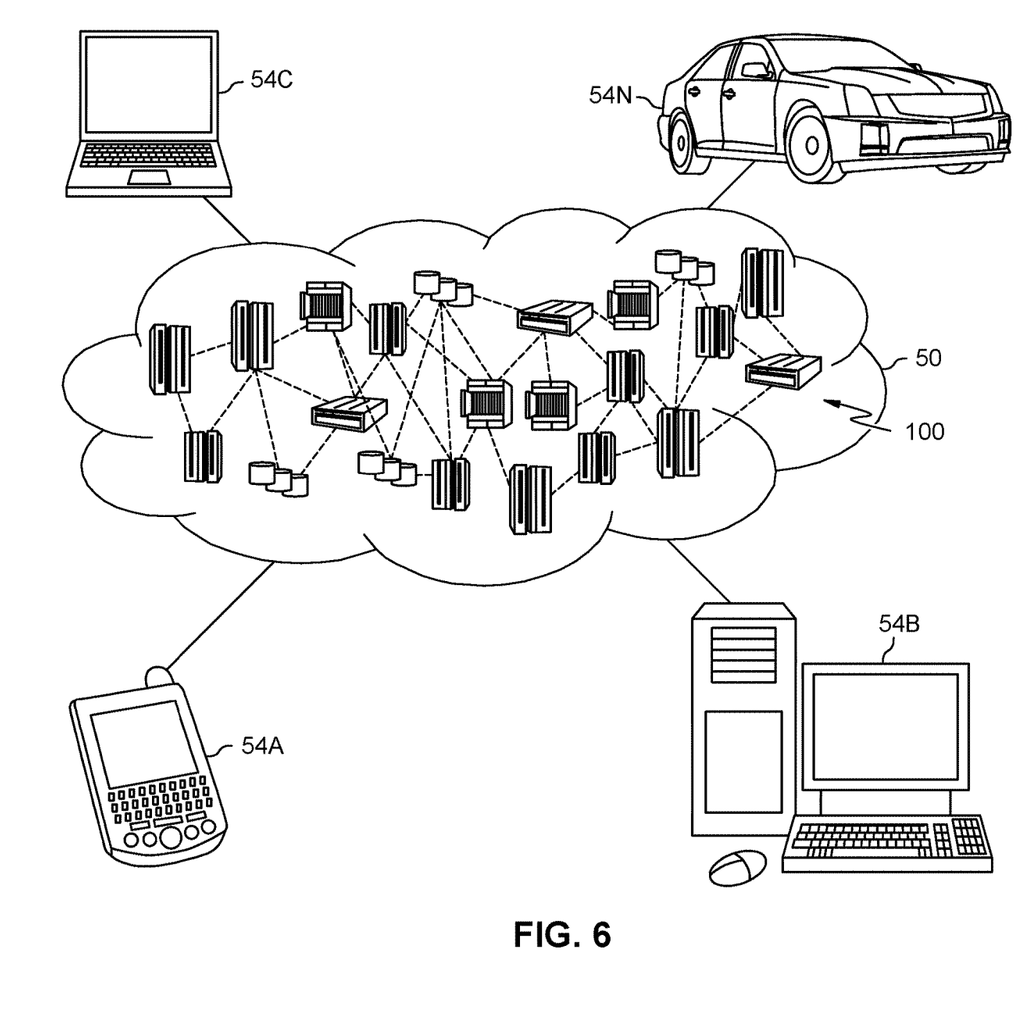
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
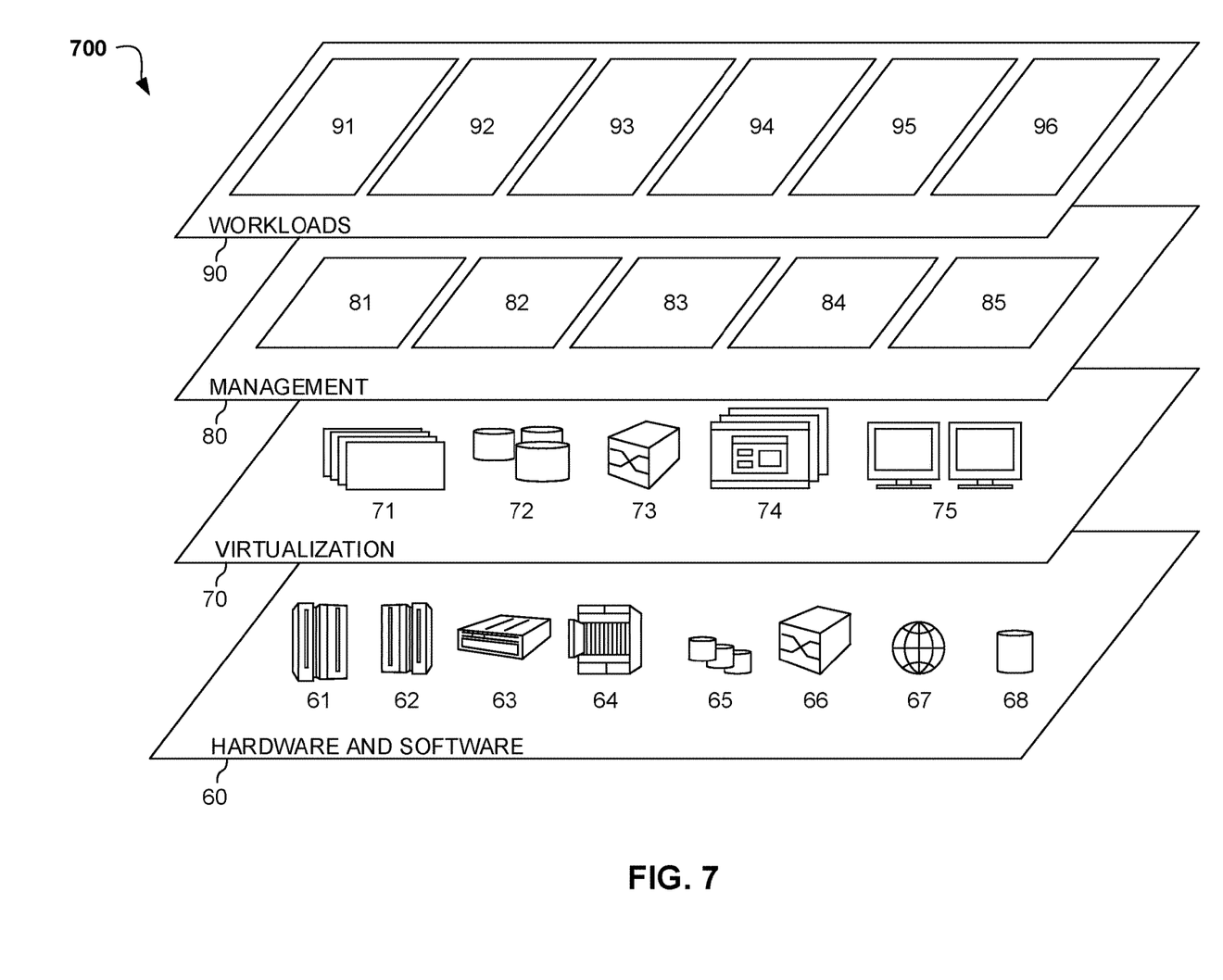
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and product attribute desirability determination 96. Product attribute desirability determination 96 may relate to analyzing product reviews to determine the sentiment towards one or more product attributes and considering the determined sentiment when generating a conversational system response to a user query pertaining to a particular product attribute.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:
   in response to receiving a user query in a conversational system related to an item, extracting, by a processor, a plurality of features and a plurality of attributes corresponding to the item;

generating a machine learning model of user preferences associated with the plurality of features and the plurality of attributes based on one or more historical user queries with the conversational system;

analyzing a plurality of reviews of the item from a plurality of databases using conjoint analysis to determine a sentiment toward the extracted features and attributes, wherein the plurality of reviews are separated into cohorts based on intended use by a review writer;

calculating a desirability score for each feature and each attribute within a cohort, wherein each feature and each attribute is assigned a tag based on the desirability score satisfying one or more thresholds related to a level of necessity that a specific feature or attribute be included in the item, and wherein the desirability score is calculated as a comparison between a total number of positive reviews of a feature or attribute and a total number of negative reviews of the feature or attribute;

generating a data analytics model that determines in which cohort the user corresponds and orders each feature and each attribute within the cohort based on each calculated desirability score satisfying a threshold value;

generating a response to the user query based on the generated data analytics model; and predicting a user approval of the generated response based on the generated machine learning model.

2. The method of claim 1, wherein a cohort of reviews is extracted from a variety of sources and categorized by reviewer to create one or more cohorts of users specific to a given category, and wherein the variety of sources comprise social media sites, online retailers, online review sites, or data analytics repositories.

3. The method of claim 1, wherein the plurality of extracted features comprises attribute information, and wherein the attribute information is selected from a group consisting of a model number, a product number, and a plurality of performance specifications.

4. A computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

in response to receiving a user query in a conversational system related to an item, extracting a plurality of features and a plurality of attributes corresponding to the item;

generating a machine learning model of user preferences associated with the plurality of features and the plurality of attributes based on one or more historical user queries with the conversational system;

analyzing a plurality of reviews of the item from a plurality of databases using conjoint analysis to determine a sentiment toward the extracted features and attributes, wherein the plurality of reviews are separated into cohorts based on intended use by a review writer;

calculating a desirability score for each feature and each attribute within a cohort, wherein each feature and each attribute is assigned a tag based on the desirability score satisfying one or more thresholds related to a level of necessity that a specific feature or attribute be included in the item, and wherein the desirability score is calculated as a comparison between a total number of positive reviews of a feature or attribute and a total number of negative reviews of the feature or attribute;

generating a data analytics model that determines in which cohort the user corresponds and orders each feature and each attribute within the cohort based on each calculated desirability score satisfying a threshold value;

generating a response to the user query based on the generated data analytics model; and predicting a user approval of the generated response based on the generated machine learning model.

5. The computer system of claim 4, wherein a cohort of reviews is extracted from a variety of sources and categorized by reviewer to create one or more cohorts of users specific to a given category, and wherein the variety of sources comprise social media sites, online retailers, online review sites, or data analytics repositories.

6. The computer system of claim 4, wherein the plurality of extracted features comprises attribute information, and wherein the attribute information is selected from a group consisting of a model number, a product number, and a plurality of performance specifications.

7. A computer program product comprising:
one or more computer-readable tangible storage media and program instructions stored on at least one of the one or more tangible storage media, the program instructions executable by a processor of a computer to perform a method, the method comprising:

in response to receiving a user query in a conversational system related to an item, extracting a plurality of features and a plurality of attributes corresponding to the item;

generating a machine learning model of user preferences associated with the plurality of features and the plurality of attributes based on one or more historical user queries with the conversational system;

analyzing a plurality of reviews of the item from a plurality of databases using conjoint analysis to determine a sentiment toward the extracted features and attributes, wherein the plurality of reviews are separated into cohorts based on intended use by a review writer;

calculating a desirability score for each feature and each attribute within a cohort, wherein each feature and each attribute is assigned a tag based on the desirability score satisfying one or more thresholds related to a level of necessity that a specific feature or attribute be included in the item, and wherein the desirability score is calculated as a comparison between a total number of positive reviews of a feature or attribute and a total number of negative reviews of the feature or attribute;

generating a data analytics model that determines in which cohort the user corresponds and orders each feature and each attribute within the cohort based on each calculated desirability score satisfying a threshold value;

generating a response to the user query based on the generated data analytics model; and predicting a user approval of the generated response based on the generated machine learning model.

8. The computer program product of claim 7, wherein a cohort of reviews is extracted from a variety of sources and categorized by reviewer to create one or more cohorts of users specific to a given category, and wherein the variety of sources comprise social media sites, online retailers, online review sites, or data analytics repositories.

9. The computer program product of claim 7, wherein the plurality of extracted features comprises attribute information, and wherein the attribute information is selected from a group consisting of a model number, a product number, and a plurality of performance specifications.

\* \* \* \* \*